US006275856B1

United States Patent
Hirata et al.

(10) Patent No.: US 6,275,856 B1
(45) Date of Patent: Aug. 14, 2001

(54) METHOD FOR SEARCHING FOR NETWORK CONNECTION PATH

(75) Inventors: Toshiaki Hirata, Kashiwa; Akihiro Urano, Fujisawa; Shuji Fujino, Ebina; Mitsugu Yamada, Yokohama; Hidetomo Nakano, Fujisawa, all of (JP); Shinji Morita, Lexington, MA (US); Satoshi Miyazaki, Yamato (JP)

(73) Assignees: Hitachi, Ltd.; Hitachi Information Networks, Ltd., both of Tokyo (JP)

( * ) Notice: Subject to any disclaimer, the term of this patent is extended or adjusted under 35 U.S.C. 154(b) by 0 days.

(21) Appl. No.: 09/510,348

(22) Filed: Feb. 22, 2000

Related U.S. Application Data

(63) Continuation of application No. 09/063,445, filed on Apr. 21, 1998, now Pat. No. 6,041,353.

(30) Foreign Application Priority Data

Apr. 22, 1997 (JP) .................................................... 9-104728

(51) Int. Cl.[7] ........................................................ G06F 13/00
(52) U.S. Cl. ......................... 709/224; 709/220; 709/223; 709/238
(58) Field of Search ................................... 709/220, 221, 709/222, 223, 224, 249, 250, 227, 238, 239; 370/351, 401, 409

(56) References Cited

U.S. PATENT DOCUMENTS 4,914,571   4/1990   Baratz et al. ........................... 707/10
5,781,537 * 7/1998   Ramaswami et al. ................ 370/254
5,850,397   12/1998  Raab et al. ............................ 370/392
5,909,549   6/1999   Compliment et al. ................ 709/223
5,953,312 * 9/1999   Crawley et al. ...................... 370/218

OTHER PUBLICATIONS

Windows NT 3.5, Guidelines for Security, Audit and Control Published on Aug. 1, 1995, By ASCII Corporation, pp. 156–159.
Japan Hewlett Packard, HP–UX, vol. No. 1, HP900 Computer (Japanese Edition) Jul., 1995.

* cited by examiner

*Primary Examiner*—Viet D. Vu
(74) *Attorney, Agent, or Firm*—Antonelli, Terry, Stout & Kraus, LLP

(57) ABSTRACT

When a computer as a logical connection destination which detected a search objective user issues a search request to first one of computers which established logical connections associated with the search objective user, the first computer selects users who used my computer in a use time of the search objective user, and executes the search request over the computers which established the logical connections associated with the selected users. The same search request is sequentially carried out over m candidates of the logical connection originator computer of my computer down to an m-th computer. Search results (a computer identifier of my computer and user identifiers of the selected users) obtained by the m computers are collected in the respective computers and returned to the logical connection destination computer in an order opposite to the search request order. With use of information widely obtained in a conventional manner, a connecting path from the logical connection originator computer to the logical connection destination computer can be searched.

12 Claims, 10 Drawing Sheets

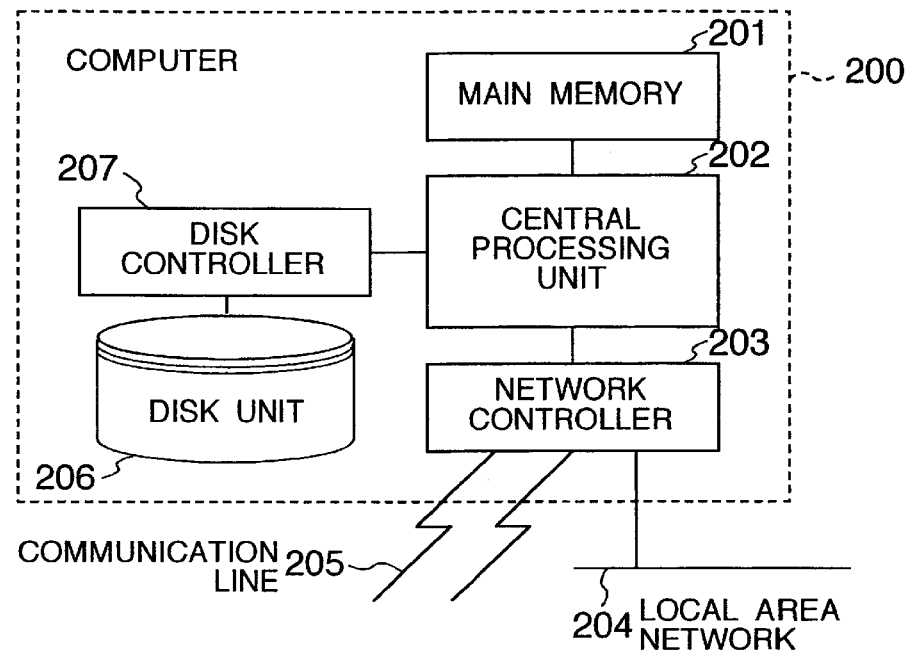
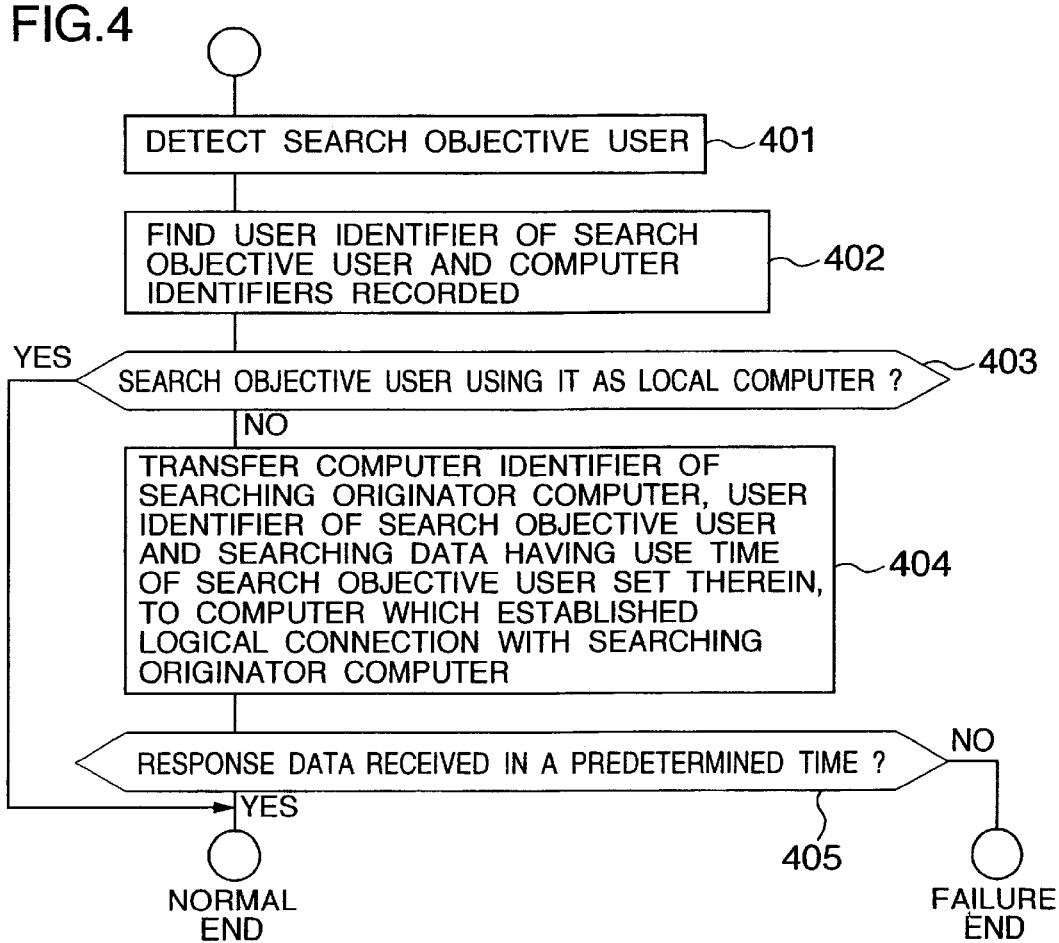

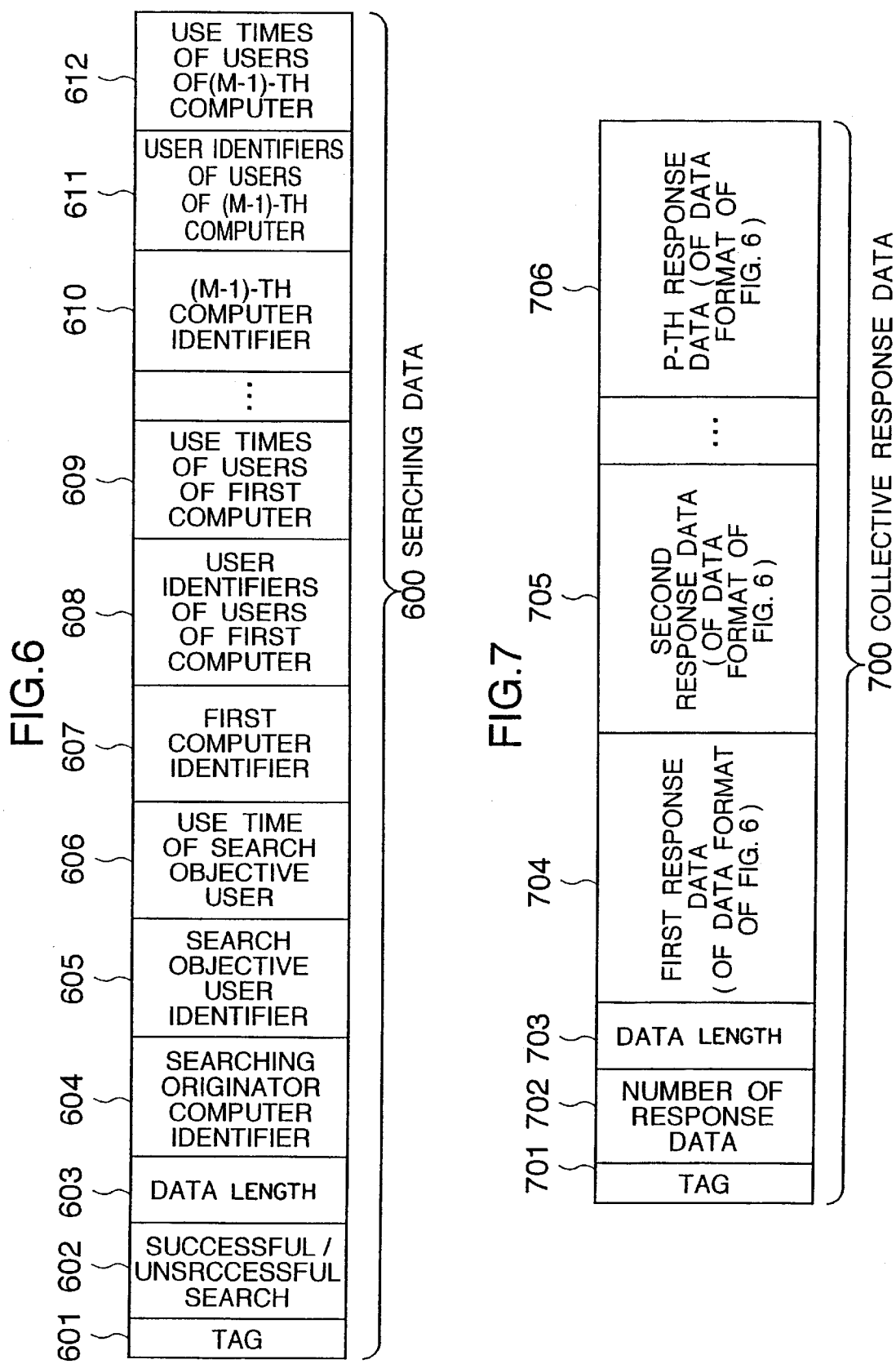

| CONNECTING PATH CANDIDATE NUMBER | NO.1 | NO.2 | NO.3 |
|---|---|---|---|
| SEARCHING ORIGINATOR COMPUTER | COMPUTER 1 / USER A | COMPUTER 1 / USER A | COMPUTER 1 / USER A |
| FIRST COMPUTER | COMPUTER 2 / USER A | COMPUTER 2 / USER B | COMPUTER 2 / USER B |
| SECOND COMPUTER | COMPUTER 3 / USER A | COMPUTER 4 / USER A | COMPUTER 4 / USER B |
| THIRD COMPUTER |  | COMPUTER 5 / USER A | COMPUTER 6 / USER A |

METHOD FOR SEARCHING FOR NETWORK CONNECTION PATH

This application is a continuation of application Ser. No. 09/063,445 filed Apr. 21, 1998, now U.S. Pat. No. 6,041,353.

BACKGROUND OF THE INVENTION

The present invention relates to a method for searching for a connecting path from a computer as a logical-connection demand originator to another computer as a logical-connection destination in a network system which comprises a plurality of such computers shared by a plurality of users and in which a logical-connection between ones of the computers is established through a pair of communication ports associated with users and more particularly, to a method for suitably searching for a connecting path from a computer as a logical-connection demand originator to another computer as a logical-connection destination when the computer originator is connected with the computer destination through one or more logical connections and a user in front of the computer destination conducts an illegal action on the computer.

In a prior art network system, there has been employed such a path searching method that respective computers use such as, e.g., an operating system known as HP-UX manufactured by Hewlett Packard Co. or use software 'TCP wrapper' to record, as an access log, information on when a logical connections was made and the connection was made from which computer. This method has so far been widely employed.

In this case, more in detail, with respect to the computers belonging to the network, when my computer is requested by an establishment demand computer to have an establishment of a logical connection with the my computer and the logical connection was established between the computers in question; the computers record the then connection establishment time, the user identifier of a user of the establishment originator computer existing in my computer and managed by my computer, and the computer identifier of the establishment originator computer in the form of an access log. And even when the logical connection was released, the computers in question record similar contents as an access log.

SUMMARY OF THE INVENTION

It is therefore an object of the present invention to provide a method for easily searching for a connecting path from a computer as a logical connection demand originator to a computer as a logical connection demand destination in a network system comprising a plurality of such computers shared by a plurality of users.

Another object of the present invention is to provide, even when a network is made on a large scale, a method for efficiently searching for a connecting path from a computer as a logical connection demand originator to a computer as a logical connection demand destination in the network.

A user identifier is an user identifier of a user allowed to use its own computer and to be managed uniquely thereby. Thus, for example, when a computer detects a user who conducted an illegal action on the computer, the user identifier of the user in question can be recognized by referring to an access log recorded in my computer. However, when the illegal user uses an establishment request originator computer which required establishment of a logical connection to my computer, it is impossible to know user identifiers managed by the establishment request originator computer.

By the way, such an illegal user, for the purpose of making its connecting path complex, tends, in many case, to logically connect a computer used by the illegal user to a target computer through a plurality of logical connections of one or more computers.

Since it is usually often to commonly use each computer by a plurality of users, such a case is considered that one computer establishes logical connections with a plurality of computers at a time.

In view of aforementioned all respects, it will be seen that, for example, in the case where my computer is logically connected to another computer through one or more computers and there exists a user who conducted an illegal action on a logical connection destination computer, the logical connection destination computer which detected the illegal user can search for the logical connection originator computer which the illegal user actually used and for a connecting path from the logical connection originator computer in a reverse order, when the logical connection destination computer is designed to be able to know the user identifier of the illegal user managed by the logical connection originator computer.

This can be realized by informing user identifiers managed by my computer to hand the user identifiers over from the logical connection originator computer to the logical connection destination computer each time each computer establishes a logical connection with another computer. However, this searching method is not preferable because this requires significant modification of the entire network system, including modification of a protocol at the time of establishing the logical connection.

In practical situations, it is preferable to use only access logs generally recorded to search for the logical connection originator computer and its connecting path. The present invention provides such a searching method. In such a searching method, however, since each computer is shared by a plurality of users, it becomes, in some cases, impossible to uniquely specify the logical connection originator computer. In actuality, candidates of the logical connection originator computer and connecting path can be obtained as a research result.

The object of the present invention is, in other words, to provide a searching method for obtaining candidates of the logical connection originator computer which a user (who conducted an illegal action on the logical connection destination computer) who logically connected it with another computer through one or more logical connections and obtaining candidates of the connecting path to the illegal-user detection computer, with use of only widely employed and available information (more concretely, access logs) and without using any special information.

When such searching is carried out in a large-scale network system, it is considered that the number of candidates obtained as a search result becomes large because of its large searching range of the network system.

To avoid this, it is an other object of the present invention to reduce the number of candidates obtained as a search result to realize effective searching by narrowing down a searching range.

In accordance with a first aspect of the present invention, the above object is attained by providing, in a network system which includes a plurality of computers capable of being shared by a plurality of users and in which a logical connection between two of the computers is established by a pair of communication ports associated with users of the two computers to manage a computer identifier of an establishment request originator computer which required the establishment of the logical connection, user identifiers of the users associated with the logical connection in my computer, and use time information of the users; a method for searching for a network connecting path from a logical connection originator computer to a logical connection destination computer with respect to users who logically connected to another computer through one or more logical connections, comprising the steps of:

transferring a search request containing the use time information of the search objective user, from the computer which detected the search objective user to the computers which established the logical connections associated with the search objective user;

selecting users who used my computer in a use time of the use time information of the search objective user contained in the search request;

in the present of the computer which established the logical connection associated with the users selected in the selection step, transferring to the computer a search request containing the use time information of the search objective user;

in the absence of the computer which established the logical connection associated with the users selected in the selection step, using as its search result the computer identifier of my computer and the user identifiers of the users in my computer; and in the case of not transferring the search request in the transfer step, transferring the search result obtained in the search result using step, to the search request originator computer which transferred the search request to my computer and, in the case of transferring the search request in the transfer step, collectively transferring the search result received from the search request destination computer and the search result obtained in the search result using step, to the search request originator computer which transferred the search request to my computer.

In accordance with a second aspect of the present invention, the above object is attained by providing, in a network system which includes a plurality of computers capable of being shared by a plurality of users and a managing computer for managing the plurality of computers and in which a logical connection between two of the computers is established by a pair of communication ports associated with users of the two computers to manage a computer identifier of an establishment request originator computer which required the establishment of the logical connection, user identifiers of the users associated with the logical connection in my computer, and use time information of the users; a method for searching for a network connecting path from a logical connection originator computer to a logical connection destination computer with respect to users who logically connected to another computer through one or more logical connections, comprising the steps of:

transferring a copy of a searching program stored in the managing computer from the managing computer to the computer which detected a user (referred to as the search objective user) whose connecting path is to be searched;

transferring a search request containing the use time information of the search objective user together with the copy of the searching program in accordance with the searching program received from the managing computer, from the computer which detected the search objective user to the computer which established the logical connection associated with the search objective user;

in the computer which received the search request from the other computer, selecting the users who used my computer in the use time indicated by the use time information of the search objective user contained in the search request in accordance with the searching program received from the search request originator computer;

in the present of the computer which established the logical connection associated with the users selected in the selection step, transferring to the computer a search request containing the use time information of the search objective user together with the copy of the searching program;

in the absence of the computer which established the logical connection associated with the users selected in the selection step, using as its search result the computer identifier of my computer and the user identifiers of the users in my computer; and in the case of not transferring the search request in the transfer step, transferring the search result obtained in the search result using step, to the search request originator computer which transferred the search request to my computer and, in the case of transferring the search request in the transfer step, collectively transferring the search result received from the search request destination computer and the search result obtained in the search result using step, to the search request originator computer which transferred the search request to my computer.

In order to obtain the above other object, in the network invasion path searching method provided in the first and second aspects, the computer which received the search request from another computer reduces the number of the users selected in the selection step down to the users who satisfy one or more predetermined conditions.

In this connection, the above condition may be 'to select the users who have the same user identifier as the user identifier of the search objective user'. In this case, the computer which detected the search objective user and the computer which received the search request from the other computer, are required to further send the user identifier of the search objective user at the time of sending a search request.

The above conditions may include one or more combinations of conditions of:

(1) 'to select the users who used the computers of the corresponding logical connection other than a predetermined computer', (2) 'to select the users who used in a time other than a predetermined time zone', (3) 'to select newly registered ones of the users', and (4) 'to select the users who are already registered but did not use even once within a predetermined time'.

In order to attain the above other object, in the network invasion path searching method, the computer which received the search request from the other computer executes the above selection step only when the number (referred to as the search request computer number) of computers which transferred the search request to the other computer and which led to my computer is equal to or smaller than a predetermined value. In this case, the computer which detected the search objective user and the computer which received the search request from the other computer are required to count up the search request computer number at the time of sending the search request for further transmission.

In order to attain the above other object, further, in the network invasion path searching method, the computer which received the search request from the other computer does not transfer the search result obtain in the search result using step to the search request originator computer which sent the search request to my computer when the number (referred to as the search request computer number) of the computers which sent the search request to the other computer and which led to my computer does not reach a predetermined value. In this case, the computer which detected the search objective user and the computer which received the search request from the other computer are required to count up the search request computer number at the time of sending the search request for further transmission.

The present invention also provides such a managing computer as to uniquely perform invasion path searching operation, as mentioned above.

That is, the present invention provides a managing computer in a network system which includes a plurality of computers and the managing computer for managing the plurality of computers and in which the plurality of computers were capable of being shaped by a plurality of users, a logical connection between two of the computers is established by a pair of communication ports associated with users of the two computers to manage a computer identifier of an establishment request originator computer which required the establishment of the logical connection, user identifiers of the users associated with the logical connection in my computer, and use time information of the users; the managing computer for collecting and managing management contents of the plurality of computers having a program which executes the following steps until the managing computer recognizes the computers as candidates of the logical connection originator computer logically connected to the logical connection destination computer:

when accepting a computer identifier of the computer (referred to as the logical connection destination computer) which is used as a logical connection destination, an user identifier of the user (referred to as the search objective user) whose connecting path is to be searched in the logical connection destination computer, and use time information of the search objective user; with respect to ones of the computers which established the logical connections established with the logical connection destination computer, associated with the search objective user in a use time of the use time information of the search objective user; a first step of acquiring computer identifiers of the selected computers and user identifiers of the users associated with the logical connections in the computers;

with respect to the users who used the computers from which the computer identifiers and user identifiers were obtained in the first step in the use time of the use time information of the search objective user, in the presence of the computer which established the logical connection associated with ones of the users who satisfy one or more predetermined conditions; a second step of acquiring the computer identifier of the computer and the user identifiers of the users in the computer; and with respect to the users who used the computers from which the computer identifiers and user identifiers were obtained in the second step in the use time of the use time information of the search objective user, in the presence of the computer which established the logical connection associated with ones of the users who satisfy one or more predetermined conditions; a third step of acquiring the computer identifier of the computer and the user identifiers of the users in the computer.

In the invention, the above conditions include one or more combinations of conditions of:

(1) 'to select the users who have the same user identifier as the user identifier of the search objective user', (2) 'to select the users who used the computers of the corresponding logical connection other than a predetermined computer', (3) 'to select the users who used in a time other than a predetermined time zone', (4) 'to select newly registered ones of the users', and (5) 'to select the users who are already registered but did not use even once within a predetermined time'.

As has been explained in the foregoing, in accordance with the present invention, candidates of the logical connection originator computer which a user (who conducted an illegal action on the logical connection destination computer) who logically connected it with another computer through one or more logical connections and obtaining candidates of the connecting path to the illegal-user detection computer can be obtained, with use of only widely employed and available information (more concretely, access logs) and without using any special information.

When such searching is carried out with use of predetermined conditions, even a large-scale network system can be efficiently searched, by narrowing its searching range and reducing the number of candidates obtained.

In this specification, the term 'computer' means not only such a device as to merely perform calculation but also such a device as to process various sorts of information including communication processing.

BRIEF DESCRIPTION OF THE DRAWINGS

FIG. 2 is a diagram for explaining a hardware structure of each computer;

FIG. 4 is a flowchart showing a processing procedure of a searching originator computer in accordance with a first embodiment of the present invention;

FIG. 6 shows a format of searching data in the first embodiment;

FIG. 7 shows a format of collective response data in the first embodiment;

DESCRIPTION OF THE PREFERRED EMBODIMENTS

The present invention will be detailed with reference to the accompanying drawings in connection with preferred embodiments of the present invention.

Figure 1:
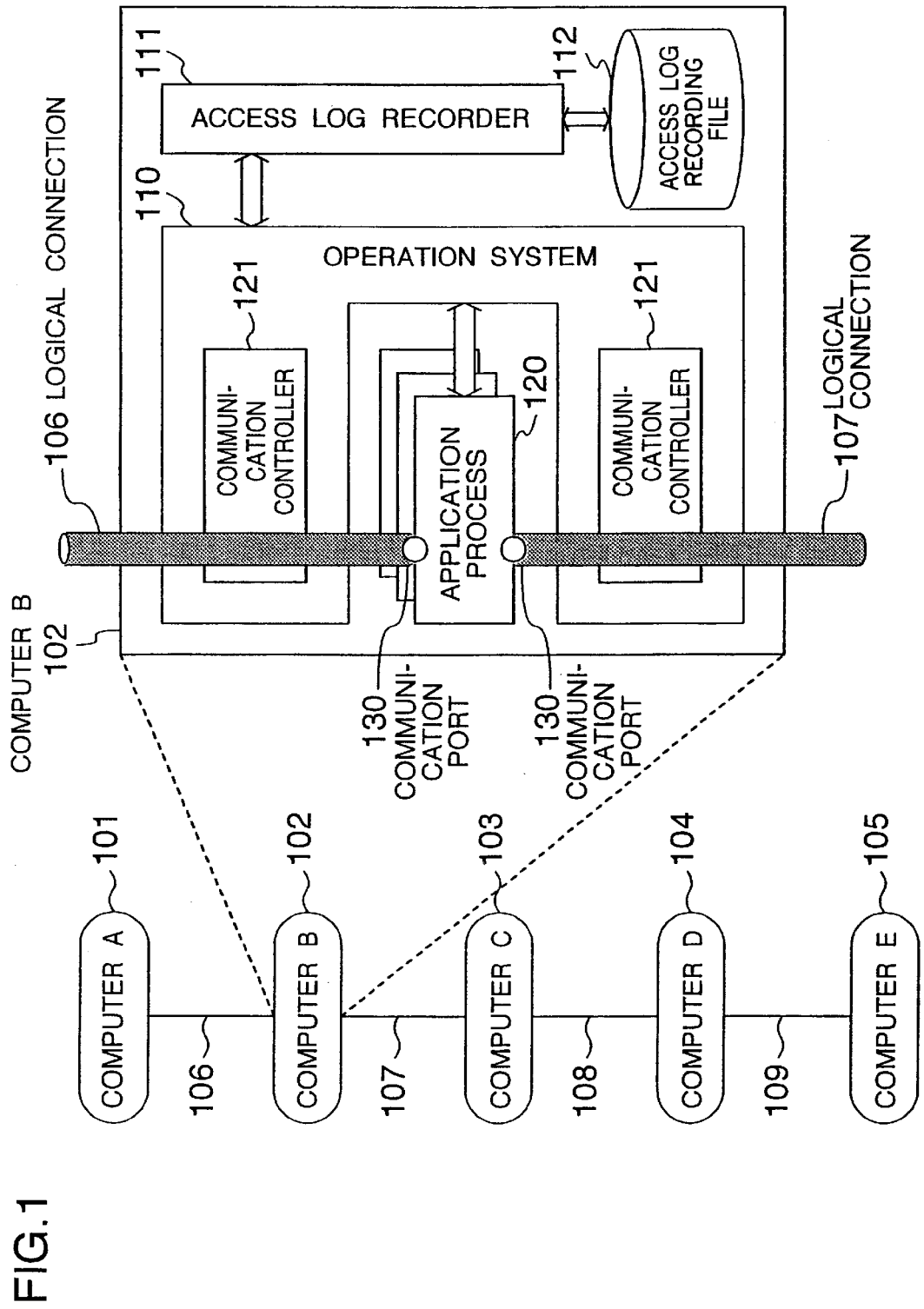
FIG. 1 is a diagram explaining a manner that two computers located at remote places are logically connected for communication and also explaining functional configurations of the computers.

Referring first to FIG. 1, there are shown a manner that two computers located at remote places are logically connected for communication and a functional arrangement of the computers.

In an example of FIG. 1, a computer A 101 is logically connected to a computer E 105 for communication via a computer B 102, a computer C 103 and a computer D 104.

More specifically, the computer A 101 is logically connected to the computer E 105 through 4 logical connections 106 to 109, that is, the logical connection 106 established between the computers A and B, the logical connection 107 established between the computers B and C, the logical connection 108 established between the computers C and D, and the logical connection 109 established between the computers D and E.

As shown in FIG. 1, the computer B 102 includes an operating system 110, an access log recorder 111, an access log recording file 112 and an access or application process 120 which starts its operation after user's certification process. The operating system 110 also has a communication controller 121.

The other computers A 101 and C 103 to E 105 also have substantially the same functional structure as that of the computer B 102.

The application process 120 includes, for example, 'telnet' or 'rlogin' used in a UNIX system. When it is desired for the computer B to access one of computers belonging to a sub-network to which IP packets cannot be sent directly in a TCP/IP network, the computer B must be once logically connected to the sub-network of the target computer through its 'telnet' or 'rlogin' process and then be connected to the target computer based on the 'telnet' or 'rlogin' process.

The operation of the system until it realizes such a logical connection as shown in FIG. 1 will be briefly explained in the following.

For the purpose of realizing eventual logical connection with the computer E 105, first, the computer A 101 establishes the logical connection 106 with the computer B 102 to start or activate the application process 120 on the computer B 102, by a user of the computer A 101 controlling its communication controller 121.

Subsequently, the computer B 102 establishes the logical connection 107 with the computer C 103 through the application process 120 activated by the computer A 101 to control its communication controller 121, thus activating the application process 120 of the computer C 103.

Similarly, the computer C 103 establishes the logical connection 108 with the computer D 104 through the application process 120 activated by the computer B to thus activate the application process 120 of the computer D; and the computer D 104 establishes the logical connection 109 with the computer E 105 through the application process 120 activated by the computer C 103 to thus activate the application process 120 of the computer E 105.

In this manner, the computer A 101 is logically connected to the computer E 105 through the 4 logical connections 106 to 109.

In this connection, an access port for use in the establishment of the logical connection between the two computers is shown by a communication port 130 in FIG. 1. The communication controller 121 functions to logically allocate the communication port 130 for each application process 120. Thus, a pair of such communication ports 130 allocated by both of the two computers cause a logical connection between the two computers. In a single computer, there may occur such a situation that a plurality of such application processes 120 are activated at the same time, in which case the computer can activate the application process 120 of a different computer through the logical connection established with use of the communication port 130 allocated to its own.

In each computer, when establishment of the logical connection with its own my computer is required and the logical connection with the establishment demand originator computer was established or released, the access log recorder 111 in the access log recording file 112 as an access log the user identifier of my computer of the user using the establishment/release-originator computer as well as the computer identifier of the establishment/release originator computer. Further, even when my computer is used as a local computer, the access log recorder 111 records the then time, the computer identifier of my computer and the user identifier of the computer using my computer as the local computer in the access log recording file 112 as an access log.

In each computer, when the user of my computer refers to the contents of the access log, he or she can know the user who used my computer, user's use information (referred to merely as the use time, hereinafter) and whether or not the user used my computer as the local computer. Further, when the user did not use my computer as the local computer, that is, when the user used another computer logically connected to my computer via one or more logical connections; the my computer user can know the computer which established with my computer.

In general, the user identifier is the uniquely managed identifier of a user who authorized to use my computer, and even with respect to the identical user, he or she might have different identifiers allocated to different computers.

FIG. 2 shows a hardware structure of each computer.

As shown in FIG. 2, a computer 200 has a central processing unit 202, a main memory 201 for storing data necessary for various sorts of calculations therein, a network controller 203 for controlling input/output of data to be transferred between my computer and such a physical communication as communication line 205 or a local area network 204, and a disk controller 207 for control of input/output of data to be transferred with a disk unit 206.

The operations of the operating system 110, application process 120, communication controller 121 and access log recorder 111 shown in FIG. 1 are realized actually when the central processing unit 202 executes a processing procedure described in a program loaded onto the main memory 201 from the disk unit 206. To this end, a processing procedure for control of execution of the application process 120 and processing procedures for control of the main memory 201, disk unit 206 and network controller 203, are also described in the operating system 110.

The access log recording file 112 shown in FIG. 1 is actually a file secured on the disk unit 206.

Explanation will next be made as to the basic principle of how to search for a network connecting path in accordance with the present invention, by referring to FIG. 3.

In the following description, the application process is referred to merely as the AP.

Figure 3:
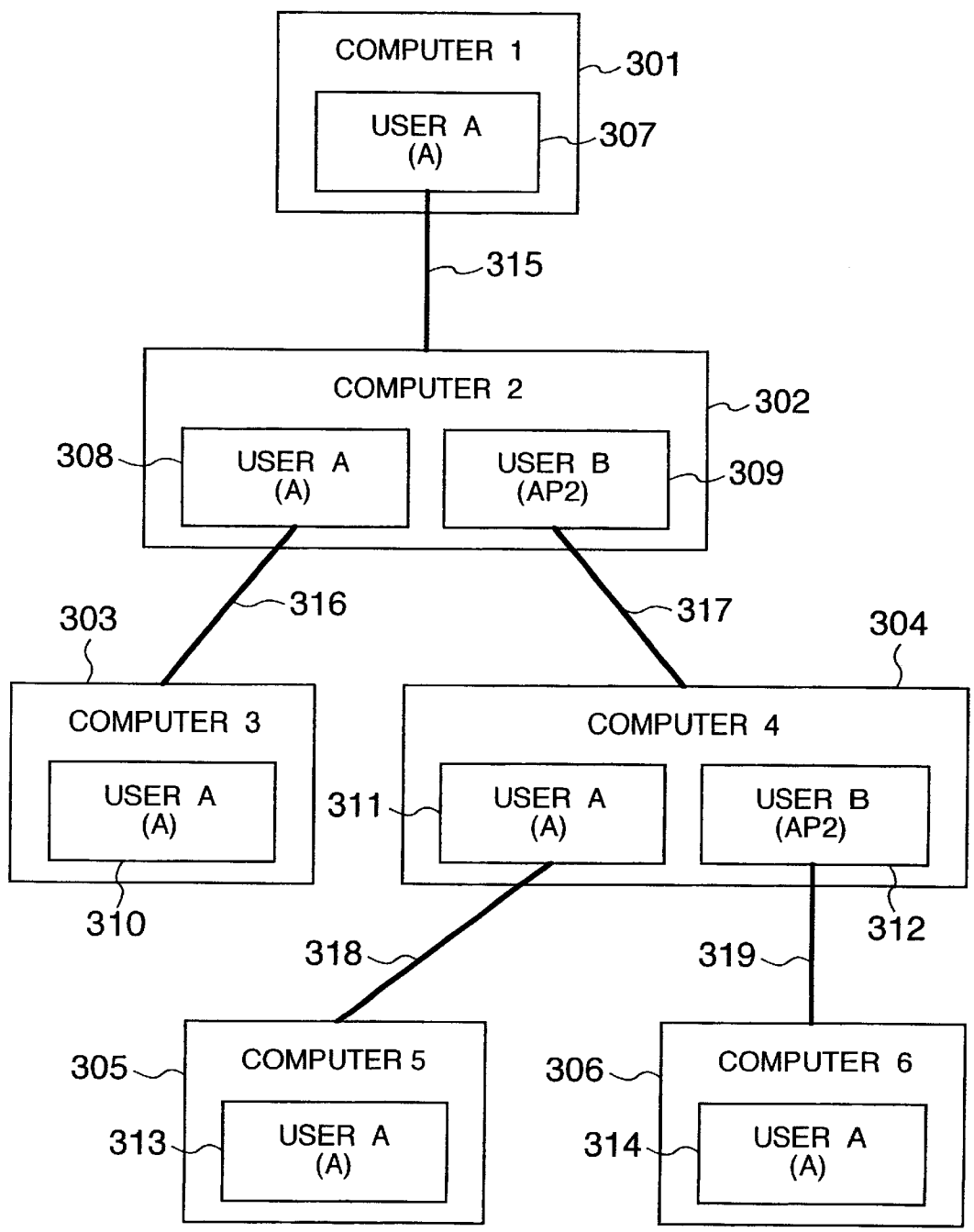
FIG. 3 shows a basic principle of a method for searching for a network connecting path in accordance with the present invention.

Shown in FIG. 3 is a manner that, when two computers located at remote locations are logically connected for communication, the computer as the logical connection destination searches for the computer as the logical connection originator following the reverse route on the basis of the access logs recorded in the respective computers.

Now, the basic principle of the method for searching for a network connecting path in accordance with the present invention will be explained in connection with a case where, as an example, when a user a 307 who activated the A conducted an illegal action on a computer 1 301, the computer 1 301 searches for a computer which the user a 307 is actually using and also searches for a connecting path to the computer 1 301.

When detecting the illegal action done by the user a 307 who started the A, the computer 1 301 refers to the access log already recorded in its own computer 1 301 to confirm that the user 307 does not use the computer 1 301 as the local computer, and also to confirm that the computer which established a logical connection 315 with my computer 301 is a computer 2 302.

In this way, a first stage of searching from the computer 1 301 to the computer 2 302 has been carried out.

The computer 2 302 refers to an access log recorded in its own computer 302 to select a user a 308 and a user b 309 who used the computer 2 302. And the computer 2 302 refers to the access log recorded in its own computer 302 to confirm that the user a 308 did not use the computer 302 as a local computer and also to confirm the computer which established a logical connection 316 with the computer 302 is a computer 3 303. The computer 2 302 also refers to the access log recorded in its own computer 302 to confirm that the user b 309 did not use the computer 302 as the local computer and to confirm that the computer which established a logical connection 317 with its own computer 302 is a computer 4 304.

In this manner, a second stage of searching has been carried out from the computer 1 301 to the computer 3 303 as well as a second stage of searching has been carried out from the computer 1 301 to the computer 4 304.

The computer 3 303 refers to an access log recorded in its own computer 303 to select a user a 310 who used the computer 3 303. And the computer 3 303 refers to the access log recorded in its own computer to confirm that the user a 310 used the computer 3 303 as a local computer. In this case, a third stage of searching is not carried out.

Meanwhile, the computer 4 304 refers to an access log recorded in its own computer 304 to select a user a 311 and a user b 312 who used the computer 4 304 when the illegal action was detected in the computer 1 301. And the computer 4 304 refers to the access log recorded in its own computer 304 to confirm that the user a 311 did not use the computer 4 304 as a local computer and also to confirm that the computer which established a logical connection 318 with the computer 4 304 is a computer 5 305. The computer 4 304 refers to the access log recorded in its own computer 304 to confirm that the user b 312 did not use the computer 4 304 as the local computer and also to confirm that the computer which established a logical connection 319 with the computer 4 304 is a computer 6 306.

In this way, a third stage of searching from the computer 1 301 to the computer 5 305 as well as a third stage of searching from the computer 1 301 to the computer 6 306 have been carried out.

The computer 5 305 refers to an access log recorded in its own computer 305 to select a user a 313 who used the computer 5 305 when the illegal action was detected in the computer 1 301. And the computer 5 305 refers to the access log recorded in its own computer 305 to confirm that the user a 313 did not use the computer 5 305 as a local computer, in which case no fourth stage of searching is carried out.

Similarly, the computer 6 306 refers to an access log recorded in its own computer 306 to select a user a 314 who used the computer 6 306 when the illegal action was detected in the computer 1 301. And the computer 6 306 refers to the access log recorded in its own computer 306 to confirm that the user a 314 used the computer 6 306 as the local computer, in which case no fourth stage of searching is carried out.

In this way, following the reverse routes, it can be found that the logical connection originator computer logically connected to the computer (301) which the illegal user actually used is either one of the computers 303, 305 and 306; the connecting path to the computer 1 301 is one of the first, second and third connecting paths of 'computer 3 303→computer 2 302→computer 1 301', of 'computer 5 305→computer 4 304→computer 2 302'→computer 1 301', and of 'computer 6 306→computer 4 304→computer 2 302'→computer 1 301', respectively. In this way, only by referring to the generally recorded access logs without using any special information, 3 types of candidates can be obtained.

Figures 11, 12:
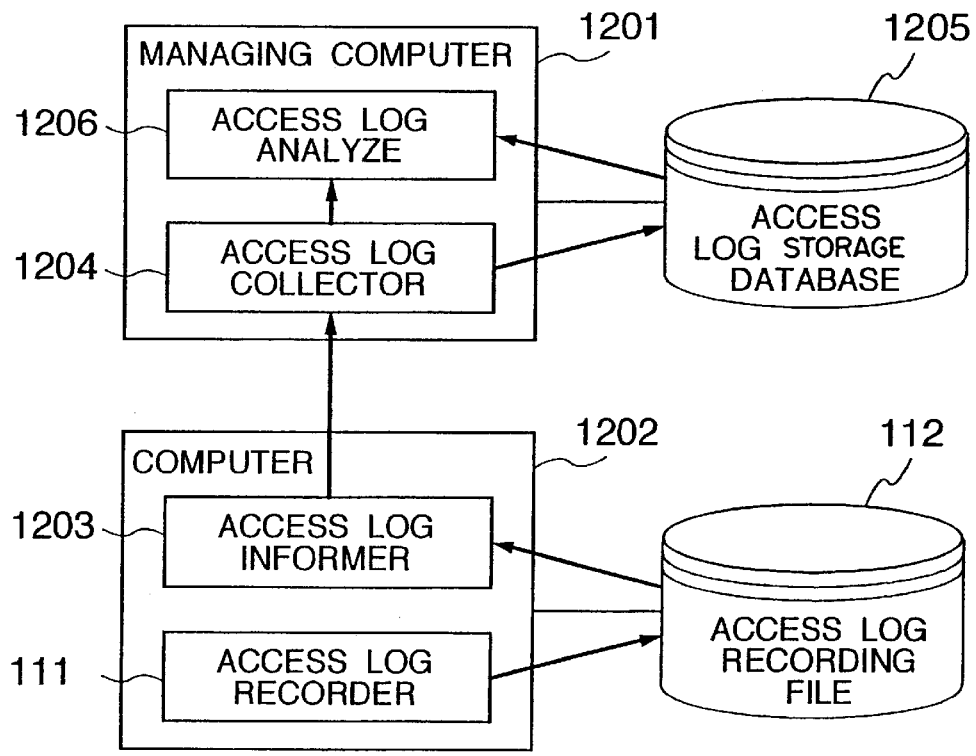
FIG. 11 shows an example of screen display of information obtained by the network connecting path searching method of the present invention.
FIG. 12 is an example of arrangement of a managing computer and another computer in a third embodiment of the present invention.

The candidates thus obtained can be shown on a screen display, for example, as shown in FIG. 11 in the computer 1 301 which detected the illegal action.

In the example of FIG. 11, the computer 1 301 which detected the illegal action user displays, on its screen, information of the computers from the computer 1 301 which detected the illegal action user to the computer as the actually used computer candidate with respect to the first to third connecting paths obtained as candidates, that is, the computer identifiers of the computers thus confirmed and the user identifiers of the users who selected in the aforementioned manner. In addition to the computer identifiers and user identifiers, use times of the users of the respective computers may be displayed as necessary.

Explanation will then be made as to a first embodiment of the present invention.

The first embodiment is intended to dynamically embody the basic principle of the aforementioned network connecting path searching method in cooperation with the computers.

Each of the computers belonging to the network system always monitors whether or not the user who activated the application process on its own computer conducted an illegal action. And when detecting the illegal action user, the computer in question executes such a processing procedure as shown by a flowchart in FIG. 4.

That is, when detecting the illegal action user (step 401), the computer executes the searching operations of steps 402 to 405.

In the following description, the illegal action user will be referred to as the search objective user and the computer which detected the search objective user is referred to as the search originator computer.

In the searching principle, the searching originator computer first refers to the access log recorded in its own computer to find the computer identifier of the computer recorded therein together with the user identifier of the search objective user (step 402).

Subsequently, when the computer identifier found in the step 402 is the computer identifier of its own computer, this means that the search objective user uses its own computer as the local computer (step 403). Thus, the searching originator computer terminates its searching operation.

When the computer identifier found in the step 402 is not the computer identifier of its own computer, this means that the search objective user uses the computer logically connected through one or more logical connections (step 403). Thus the searching originator computer creates searching data in which the computer identifier of its own computer, the user identifier of the search objective user and the use time of the search objective user are set; and transmits the created searching data to the computer corresponding to the computer identifier found in the step 402, that is, to the computer which established a logical connection with its own computer (step 404).

After this, the searching originator computer, when receiving response data from the computer to which the searching data was sent within a predetermined time (step 405), regards the searching as to have succeed and terminates its searching operation. Otherwise, the searching originator computer regards it as to have failed and terminates its searching operation.

Figure 5:
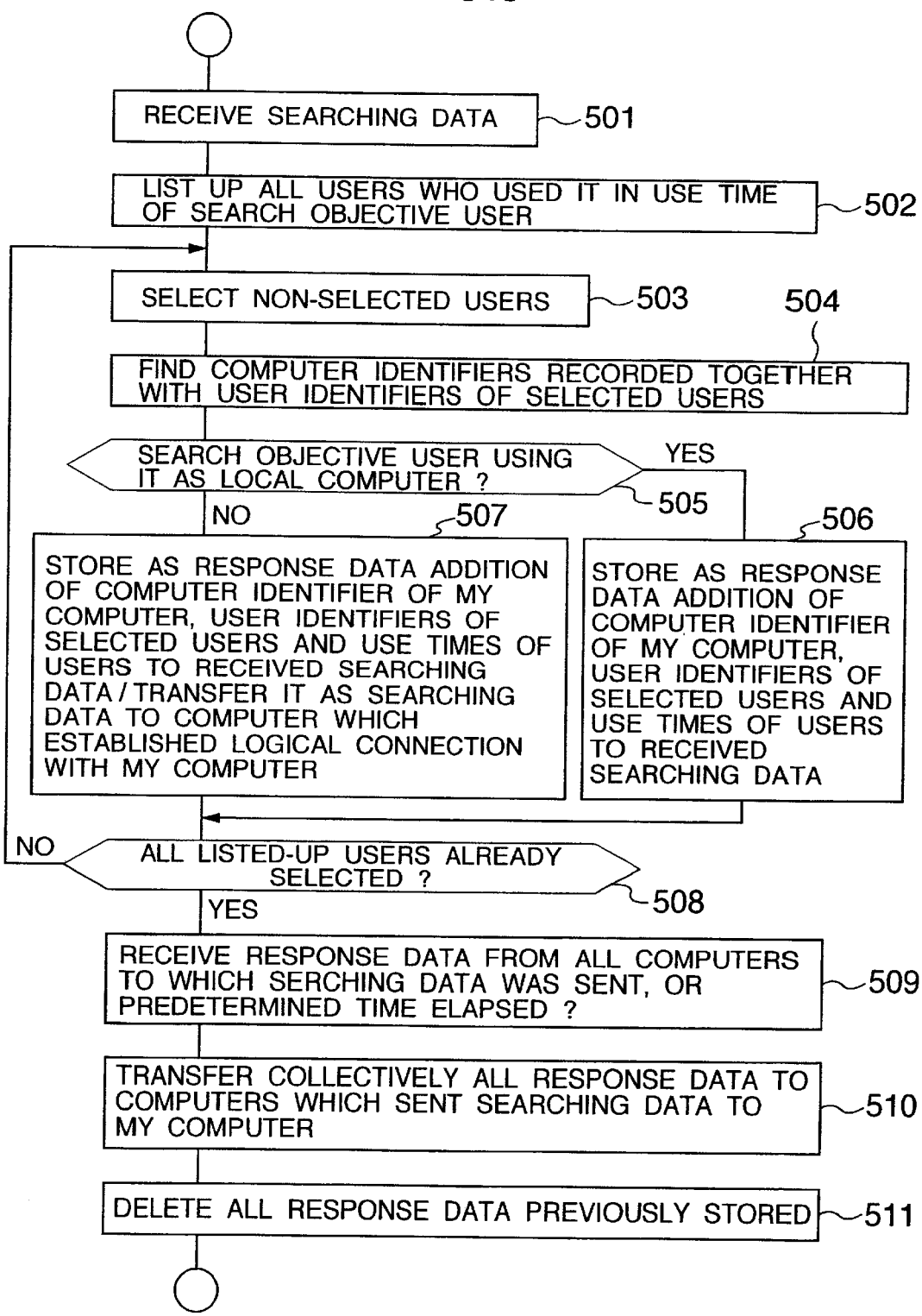
FIG. 5 is a flowchart showing a processing procedure of a computer other than the searching originator computer in the first embodiment.

Meanwhile, the first computer which received the searching data from the searching originator computer, executes such a processing procedure as shown by a flowchart in FIG. 5.

More in detail, the first computer, when receiving the searching data from the searching originator computer (step 501), executes the searching operations of steps 502 to 511.

In the searching operation, the first computer first refers to the access log recorded in its own computer and lists up all users who used its own computer in the user time of the search objective user set in the searching data (step 502).

Of all the users listed up in the step 502, the first computer selects the not-selected user (step 503). The first computer refers to the access log recorded in its own computer to find the computer identifier recorded together with the user identifier of the user selected in the step 503 (step 504).

Subsequently, when the computer identifier found in the step 504 is the computer identifier of its own computer, this means that the user selected in the step 503 uses its own computer as the local computer (step 505). Thus the first computer adds the computer identifier of its own computer, the user identifier of the user selected in the step 503 and the use time of the user to the searching data received in the step 501, and stores it as response data (step 506).

Further, when the computer identifier found in the step 504 is not the computer identifier of its own computer, this means that the user uses the computer logically connected through one or more logical connections (step 505). Thus the first computer adds the computer identifier of its own computer, the user identifier of the user selected in the step 503 and the use time of the user to the searching data received in the step 501; stores it as response data; and then transfers the response data as searching data to the computer corresponding to the computer identifier found in the step 504, that is, to the computer which established a logical connection with its own computer (step 507).

Then the first computer executes the processing procedure of the steps 503 to 507 with respect to all the users listed up (step 508). When the first computer receives the response data from all the computers to which the searching data was sent in the step 507 or when a predetermined time elapses (step 509), the first computer sends all the receive response data and all the response data stored in the step 506 collectively to the searching originator computer (step 510).

In the step 510, however, when the computer fails to receive, within the predetermined time, the response data from all the computers to which the searching data was sent in the step 507, the computer regards the searching as to have failed and in place of the response data, uses the response data stored in the step 507.

Finally, the first computer deletes all response data previously stored in the steps 506 and 507 (step 511) and terminates its searching operation.

The searching operation explained in FIGS. 4 and 5 is implemented by a connecting path searching program different from the AP. To this end, in the first embodiment, the operating system 110 has the connecting path searching program or such a connecting path searching program is provided as one application program, though not shown.

A second computer, which received the searching data from the first computer, executes such a processing procedure of the first computer regarded as the searching originator computer shown in FIG. 5. Similarly, the i-th computer, which received the searching data from the (i−1)-th computer also executed such a processing procedure of the first computer regarded as the searching originator computer as shown in FIG. 5.

In this way, the searching data is sequentially transferred from the searching originator computer to such an m-th computer that the candidate of the logical connection originator computer logically connected to the searching originator computer is used as its own computer, so that the response data to the respective searching data are collected in each computer and sequentially returned from the m-th computer to the searching originator computer.

In this conjunction, the above expression of 'such a computer that the candidate of the logical connection originator computer logically connected to the searching originator computer is used as its own computer' refers to a computer which did not proceed to the step 507 in FIG. 5 even once, that is, which did not send the searching data to another computer.

FIG. 6 shows a format of the searching data.

Shown in FIG. 6 is the format of the searching data 600 to be sent from the (m−1)-th computer to such an m-th computer that the candidate of the logical connection originator computer logically connected to the searching originator computer is used as its own computer.

As shown in FIG. 6, more specifically, the searching data 600 has a tag 601 indicative of the searching data, a information 602 indicative of success or failure of the searching, a data length 603 and actual data contents 604 to 612.

Parts of the searching data 600 transferred from the searching originator computer to the first computer correspond to the tag 601, data length 603, computer identifier 604 of the searching originator computer, user identifier 605 of the search objective user and use time 606 of the search objective user.

Parts of the searching data 600 transferred from the first computer to the second computer correspond to, in addition to the searching data transferred from the searching originator computer to the first computer, the first computer identifier 607, the user identifier 608 of the user selected in the step 503 of FIG. 5 and the user time 609 of the user. In this case, the data length 603 is modified.

The m-th computer, when receiving the searching data 600 from the (m−1)-th computer, sends all the response data stored in the step 506 of FIG. 5 collectively to the (m−1)-th computer, in which case the collectively sent response data correspond to collective response data 700 of such a data format as shown in FIG. 7.

More in detail, as shown in FIG. 7, the collective response data 700 has a tag 701 indicative of the collective response data, the number 702 of response data, a data length 703 and individual response data 704 to 706.

Parts of the collective response data 700 transferred from the m-th computer to the (m−1)-th computer correspond to, in addition to such searching data 600 as shown in FIG. 6, the computer identifier of the m-th computer, the user identifier of the user selected in the step 503 of FIG. 5 and the user time of the user, as response data 704. In this case, however, the data length 603 is modified and the contents indicative of 'success' is set in the successful or unsuccessful search field 602.

Further, each of the (m−1)-th to first computers, when receiving the response data (actually collective response data) from all the computers to which its own computer sent the searching data, collects the collective response data and all the response data stored in the step 506 of FIG. 5 to have the same data format as such a collective response data 700 as shown in FIG. 7; and then sends it to the computer which sent the searching data to its own computer. However, when the my computer fails, within the predetermined time, to receive the collective response data from all the computers to which my computer sent the searching data, my computer uses, in place of such response data, the response data stored in the step 507 of FIG. 5, at which time 'failure' is set in the successful or unsuccessful search field 602.

Since the collective response data received by the searching originator computer contains a collection of the response data indicative of connecting paths from the computers as the candidates of the logical connection originator computer logically connected to the searching originator computer; the searching originator computer, on the basis of the received collective response data, can display on the screen the candidates of the logical connection originator computer and candidates of the connecting path to the searching originator computer.

As has been explained in the foregoing, in accordance with the first embodiment, the searching originator computer can obtain the candidates of the computer which the search objective user actually used (logical connection originator computer logically connected to the searching originator computer) and candidates of the connecting path to the searching originator computer, with use of only generally recorded access logs and without using any special information.

In particular, at the time of detecting the search objective user, searching can be carried out on a real time and parallel basis and the response data can be collectively sent, which results in that the searching load of the network can be suppressed and minimized.

Although the searching procedure has been automatically carried out when the searching originator computer detected the search objective user in the foregoing first embodiment, the searching procedure may be carried out, for example, when a network administrator enters a command.

In the latter case, when it is desirable for the network administrator to examine the access log recorded in a given computer to detect a user who the administrator wants to handle as the search objective user, the network administrator is only required to enter in the computer a search indication command instructing a search based on the user identifier and use time of the user in question as its parameters.

In the aforementioned first embodiment, the computer which received the searching data lists up all the users who used its own computer in the use time of the search objective user and executes the searching procedure, whereby the users listed up can be narrowed down on the basis of predetermined conditions.

To this end, in the step 502 of FIG. 5, the computer is designed to list up only one or ones of all the users who used the my computer in the use time of the search objective user, which satisfies or satisfy the predetermined conditions.

Since the users can be narrowed down, the number of response data can be reduced and thus the number of candidates obtained by the searching originator computer can be made small.

The first narrowing-down condition is, for example, to select 'ones of the users who have the same user identifier as the user identifier of the search objective user'. In order to judge whether to satisfy the first condition, it is required to examine the user identifiers of all the users who used my computer in the use time of the search objective user.

As has been explained above, it is general that each of the computers uniquely manages the user identifiers of users who are allowed to use my computer. However, an identical user may be, in some cases, allowed to use a user identifier which is commonly allocated to all the computers.

When an unauthorized user uses a computer and illegally logically connects it to another computer, the employment of the first condition can effectively prevent such illegal use, because it is estimated that, taking the above computer configuration into consideration, the invader uses the same user identifier to establish a logical connection for invasion into the target computer.

The possible narrowing-down condition is, for example, to select 'one or ones of the users who used computers other than a predetermined computer'. In order to judge whether or not to satisfy the second condition, it is only required to examine the computer identifiers recorded in the access logs as associated with the user identifiers of all the users who used my computer in the use time of the search objective user.

For example, in the case of the network of a company, when a user wants to use a computer installed in a research department of the company to connect it to a computer which is installed in an accounting department of the company but which the user is not authorized to use, the employment of the second condition can effectively prevent such an illegal use.

The third narrowing-down condition is, for example, to select 'users who used my computer in a time other than a predetermined time zone'. In order to judge whether or not to satisfy the third condition, it is only required to examine the use times of all users who used my computer in the use time of the search objective user, which are recorded in the access log as associated with the user identifiers of the users, that is, the logical-connection establishment/release times (use start/end times when my computer is used as the local computer).

The third condition is effective for an illegal user when the actual operational time zone (e.g., in the case of a company network, the working time of the company) of a network system is used as the predetermined time zone in the third condition, because the illegal user usually don't know the actual operational time zone.

The fourth condition is, for example, to select 'a user or users who newly registered their user identifiers' or to select 'a user or users who have already-registered user identifiers but did not use my computer within a predetermined time even once'. In order to judge whether or not to meet the fourth condition, it is required, in the former case, to manage the newly registered times of the new user identifiers; and in the latter case, to manage the user identifiers of all the users who used my computer within the predetermined time.

Since such a user as to satisfy the latter of the fourth condition rarely uses the network system, there is a possibility that the user identifier of such a user may be wrongly used by an illegal user. With respect to such a user as to satisfy the former of the fourth condition, it is preferable to previously know the computer of its logical-connection originator. To this end, the fourth condition can be effectively used.

Further, in the foregoing first embodiment, the number of candidates obtained by the searching originator computer can be narrowed down, by executing the processing procedure of the step 502 and subsequent steps in FIG. 5 only when the searching data received at the step 501 of FIG. 5 satisfies a predetermined condition.

The narrowing-down condition (referred to as the fifth condition in the following explanation) is, for example, that 'the number of computers through which the searching data reached my computer be not larger than a predetermined number'. In order to judge whether or not to satisfy the fifth condition, the number of computer identifiers set in the searching data received at the step 501 of FIG. 5 is examined.

In a large-scale network system, its searching range becomes large. The searching range can be limited by aborting the searching operation when the number of computers the searching data reached my computer exceeds a predetermined number. Thus, when it is desired to merely restrict the searching range, the fifth condition becomes effective.

Further, when the foregoing first embodiment is arranged so that the response data already stored at the step 506 of FIG. 5 is transferred in the step 510 of FIG. 5 only when the searching data received at the step 501 of FIG. 5 satisfies the predetermined condition; the number of candidates obtained by the searching originator computer can be made small.

The narrowing-down condition (referred to as the sixth condition, in the following explanation) may be, for example, 'the number of computers through which the searching data arrived at my computer, be equal to or larger than a predetermined value'. In order to judge whether or not to satisfy the sixth condition, it is only required to examine the number of computer identifiers already stored in the searching data received at the step 501 of FIG. 5.

When an illegal user uses his or her own computer to illegally logically connect it to another computer, the illegal logical connection is carried out often through a number of computers to make its connection route more complicate. Accordingly, when the number of computers through which the searching data reached my computer, does not reach the predetermined value, this means that the number of computers present in the connection route indicated by the response data previously stored at the step 506 of FIG. 5. Thus when the sixth condition is used so as not to transfer such response data, the connection route indicated by the response data can be removed from its candidates.

As has been mentioned above, even in a large-scale network system, its effective searching can be realized by reducing the number of candidates obtained by the searching originator computer.

Desired two or more of the aforementioned narrowing-down conditions can be employed, in which case the narrowing-down operation may be carried out when any one of the employed conditions is satisfied or when all of the employed conditions are satisfied.

Explanation will be next made as to a second embodiment of the present invention.

The second embodiment is when the basic principle of the aforementioned method for searching for a network connecting path is dynamically implemented so that computers are cooperative under control of a network managing computer.

Figure 8:
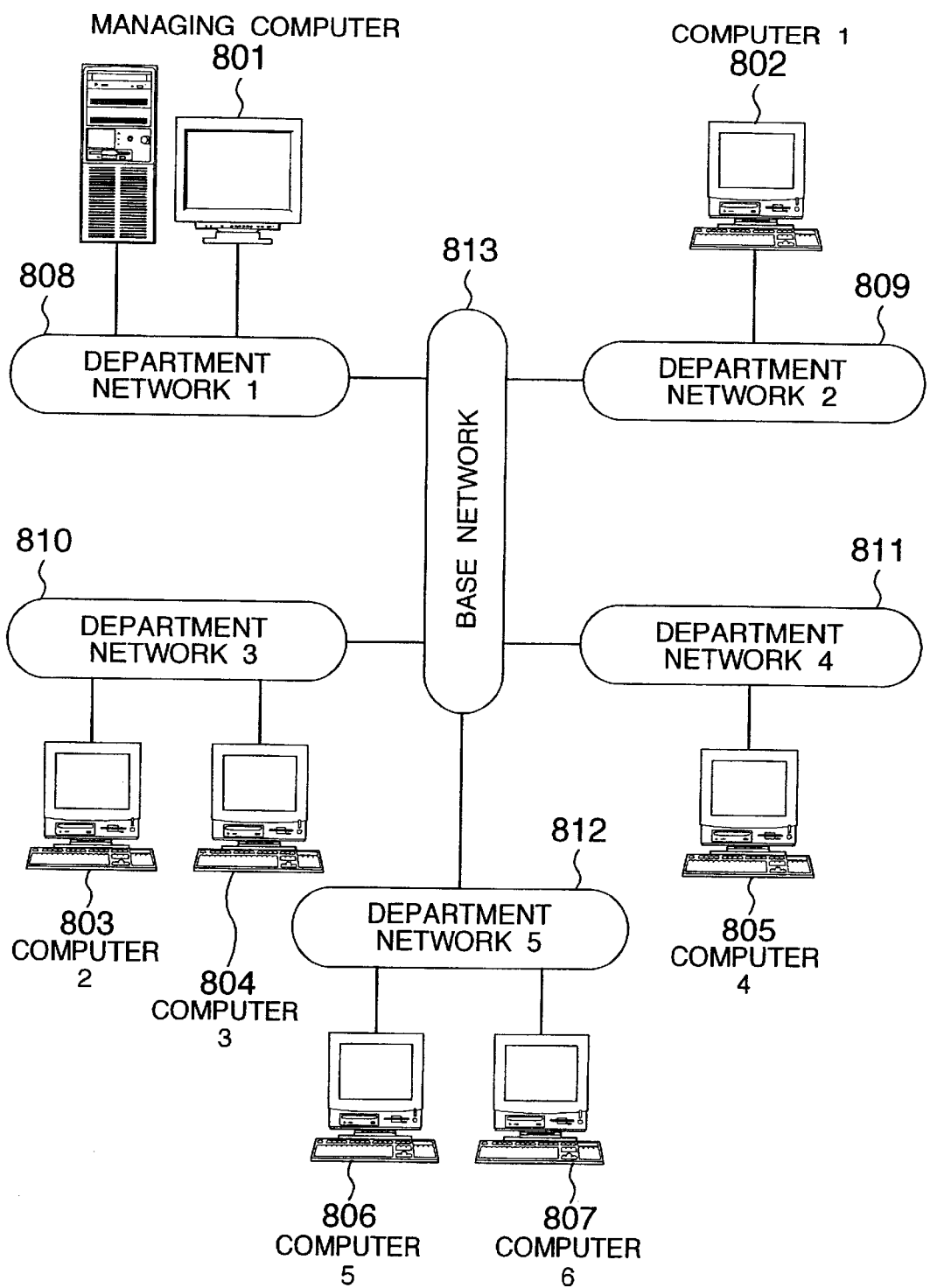
FIG. 8 shows an exemplary arrangement of a network system in accordance with a second embodiment of the present invention.

Shown in FIG. 8 is an example of arrangement of a network system in accordance with the second embodiment.

In FIG. 8, reference numeral 801 denotes a managing computer, and numerals 802 to 807 denote computers 1 to 6. In an example of FIG. 8, 5 networks of department networks 1 (808) to 5 (812) are physically connected to each other via a base network 813.

Each of the computers 1 (802) to 6 (807) always monitors an AP activated on its own computer as to whether or not the user who activated the AP conducted an illegal action on the computer. When the computer detects the user (search objective user) who conducted an illegal action, it informs the managing computer 801 of the illegal action.

The managing computer 801 transfers a searching agent as a searching program to the computer as the above information teller to instruct the start of the searching with use of the computer as the searching originator computer.

The searching agent is arranged to be started by the transfer destination computer. Accordingly, in the second embodiment, the computers 1 (802) to 6 (807) have the same arrangement as that of the computers in the foregoing first embodiment, but it is unnecessary for the operating system 110 to have the searching program and, when the searching program is implemented as one of application programs, it becomes unnecessary to be resident as the searching program.

Figure 9:
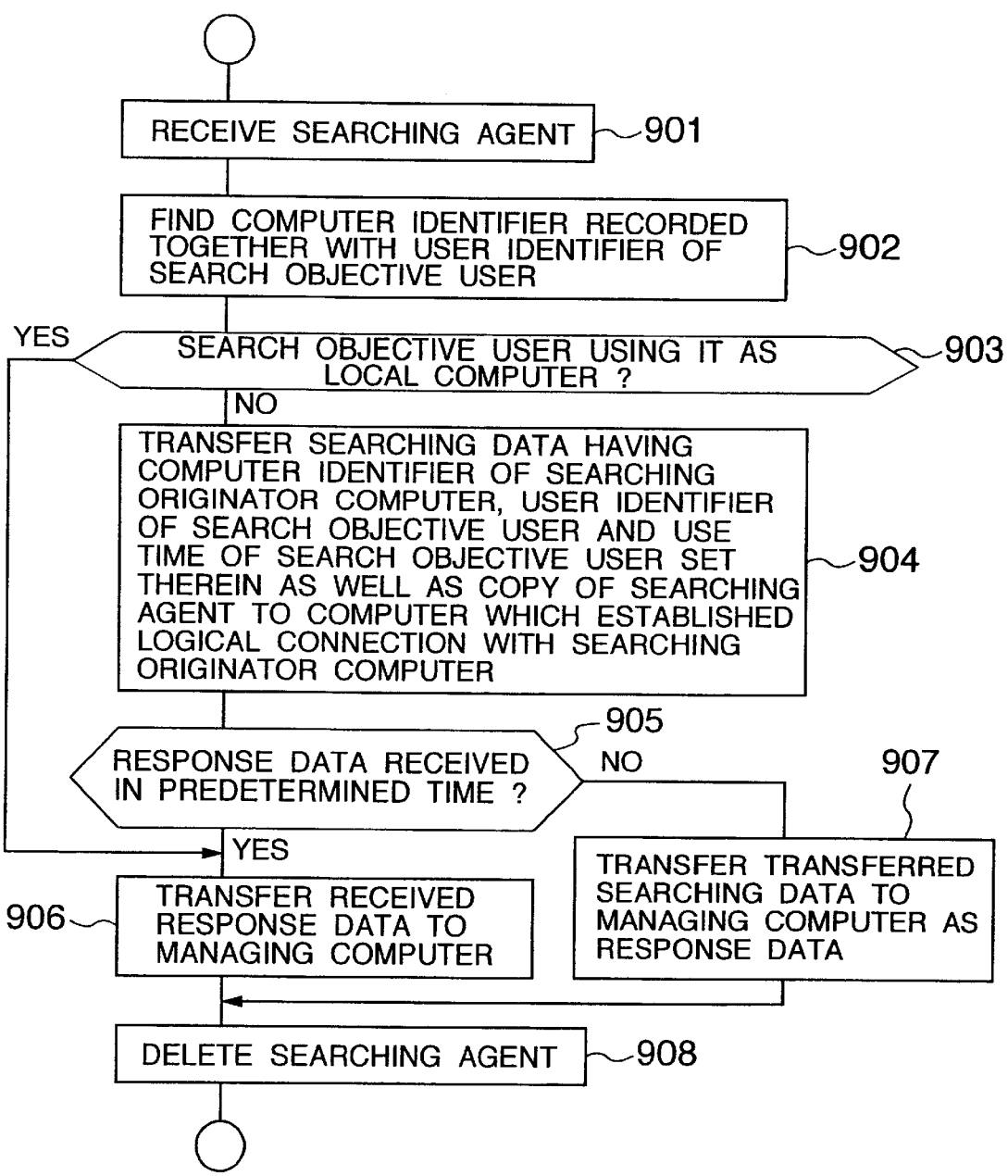
FIG. 9 is a flowchart showing a processing procedure of a searching originator computer in the second embodiment.

And the computer (searching originator computer) which received the searching agent from the managing computer 801 executes such a processing procedure as shown by a flowchart in FIG. 9.

More in detail, the searching originator computer, when receiving the searching agent from the managing computer 801 (step 901), executes in steps 902 to 904 searching operations similar to those shown in the steps 402 to 404 of FIG. 4.

In the step 904, however, the searching originator computer transfers a copy of the searching agent together with searching data.

Subsequently, the searching originator computer, when receiving response data (collective response data) from the computer which transmitted the searching data and searching agent (step 905), sends the received response data to the managing computer 801 to indicate that the searching was successful (step 906). The searching originator computer otherwise sends the searching data which the originator computer sent in the step 904 to the managing computer 801 as response data (step 907).

Finally, the searching originator computer deletes the searching agent (step 908) and then terminates its searching operation.

Figure 10:
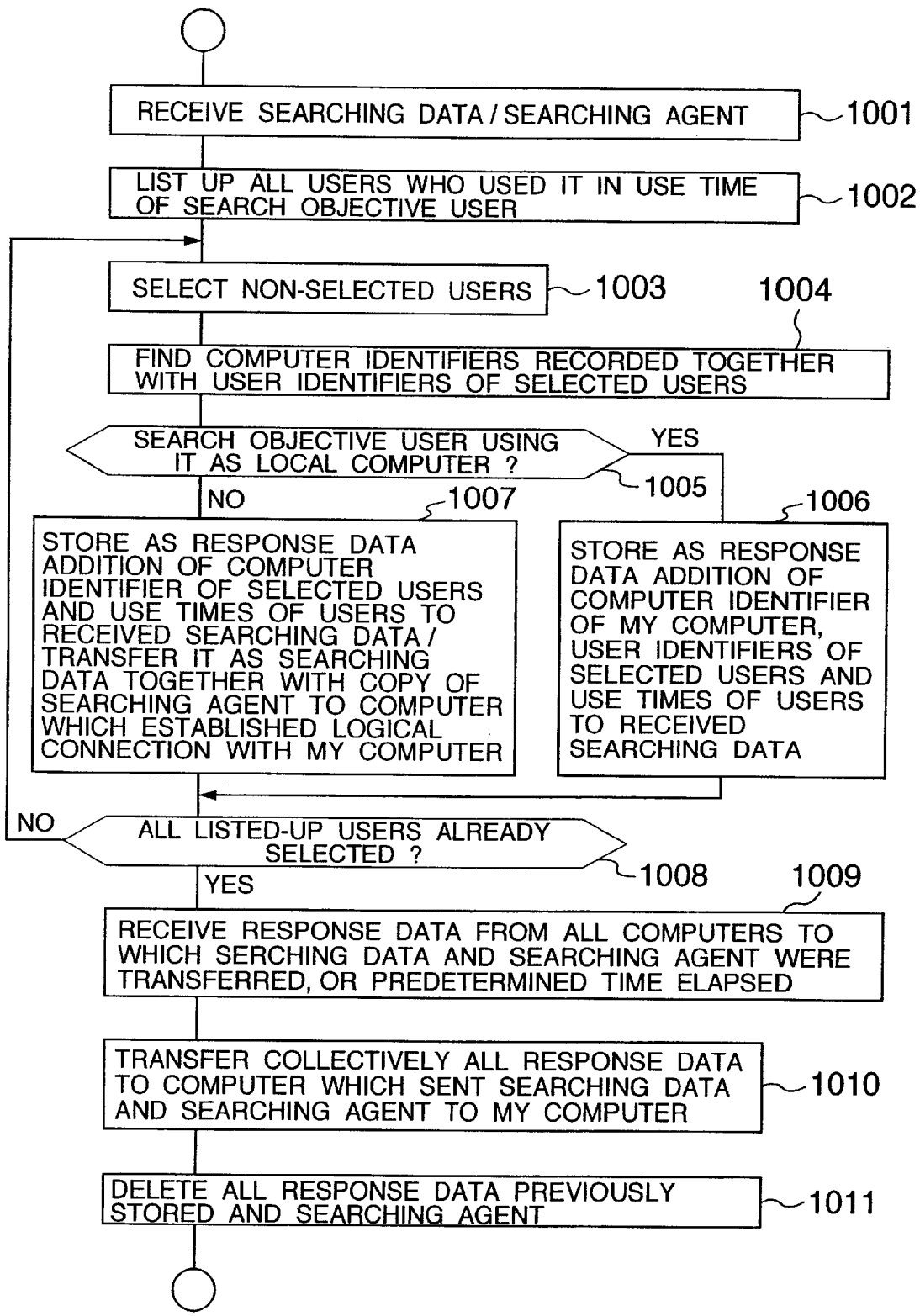
FIG. 10 is a flowchart showing a processing procedure of a computer other than the searching originator computer in the second embodiment.

Meanwhile, a first computer which received the searching data and searching agent from the searching originator computer executes such a processing procedure as shown by a flowchart in FIG. 10.

That is, the first computer, when receiving the searching data and searching agent from the searching originator computer (step 1001), executes, in steps 1002 to 1010, searching operations similar to those shown in the steps 502 to 510 of FIG. 5.

In the step 1007, however, the first computer sends a copy of the searching agent together with the searching data.

Finally, the first computer deletes all the response data so far stored therein in the step 1006 and 1007 and also deletes the searching agent (step 1011), and then terminates its searching operations.

A second computer which received the searching data and searching agent from the first computer, regards the first computer as the searching originator computer, and then executes such a processing procedure as shown in FIG. 10. Similarly, an i-th computer which received the searching data and searching agent from an (i−1)-th computer regards the first computer as the searching originator computer and executes such a processing procedure as shown in FIG. 10.

In this manner, the searching data and searching agent are sequentially transferred from the searching originator computer to such an m-th computer that a candidate of the logical-connection originator computer logically connected to the searching originator computer is my computer under control of the managing computer 801, so that the response data for the respective searching data are collected in each computer and sequentially returned from the m-th computer to the searching originator computer.

The searching data and collective response data have the same data formats as shown in FIGS. 6 and 7.

The collective response data received by the managing computer 801 from the searching originator computer collectively contain the response data indicative of respective connecting paths from the computers which become the candidates of the logical connection originator computer logically connected to the searching originator computer. Thus on the basis of the received collective response data, the managing computer 801 can display on its screen the candidates of the logical connection originator computer and the candidates of the connecting paths to the searching originator computer.

As has been explained in the foregoing, in accordance with the second embodiment, only with use of generally recorded access logs and without using any special information, the managing computer 801 can know the candidates of the computer (the logical connection originator computer logically connected to the searching originator computer) which the search objective user actually used as well as the candidates of connecting paths to the searching originator computer.

In particular, when the managing computer 801 detects the presence of the search objective user, it can search for the illegal user on a real-time and parallel basis and the response data are collectively transferred, whereby the load of the network necessary for the searching can be minimized.

Although the computer which received the searching data and searching agent has listed up all the users who used my computer in the use time of the search objective user in the foregoing second embodiment to execute the searching procedure, the number of such users as listed up may be reduced in accordance with the predetermined conditions as in the foregoing first embodiment.

In the latter case, in the step 1002 of FIG. 10, of all the users who used my computer in the use time of the search objective user, only ones who satisfy the predetermined conditions are required to be listed up.

Through such user narrowing-down operation, the number of response data can be reduced and thus the number of candidates obtained by the managing computer 801 can be decreased.

In this case, usable as the narrowing-down conditions are, for example, the aforementioned first to fourth conditions.

Further, when the foregoing second embodiment may be arranged so that, only when the searching data received at the step 1001 of FIG. 10 satisfy a predetermined condition, the processing operations of the step 1002 of FIG. 10 and subsequent steps are executed to thereby reduce the number of candidates obtained by the managing computer 801.

In this case, usable as the narrowing-down condition is, for example, the aforementioned fifth condition. In order to judge whether or not to satisfy the fifth condition, it is only required to examine the number of computer identifiers set in the searching data received in the step 1001 of FIG. 10.

Furthermore, the foregoing second embodiment may be configured so that, only when the searching data received in the step 1001 of FIG. 10 satisfy a predetermined condition, the response data already stored in the step 1006 of FIG. 10 is transferred in the step 1010 of FIG. 10 to thereby reduce the number of candidates obtained by the managing computer 801.

In this case, employable as the narrowing-down condition is, for example, the aforementioned sixth condition. In order to judge whether or not to meet the six condition, it is only required to examine the number of computer identifiers set in the searching data received in the step 1001 of FIG. 10.

In the foregoing first embodiment, the provision of the managing computer is not necessarily required and thus the managing computer 801 may be provided as a network system having substantially the same arrangement as the foregoing second embodiment. In the latter case, the searching originator computer may inform the managing computer 801 of the received collective response data, and the managing computer 801, on the basis of the informed collective response data, may display its screen the candidates of the logical connection originator computer logically connected to the searching originator computer as well as the candidates of connecting paths to the searching originator computer.

In the foregoing first and second embodiments, each computer sequentially adds the computer identifier, user identifier and use time of my computer to the searching data received by my computer, whereby, at the time of transferring the response data, it is only required to simply collect all the response data received by my computer as well as all the response data previously stored by my computer. In this connection, however, only the contents (such as the use time of the search objective user) necessary for the searching at the minimum may be set in the searching data.

In this case, at the time of sending the response data, each computer sequentially adds the computer identifier, user identifier and use time of my computer to the response data received by my computer, in which case it is required to know which additional contents are added to which response data.

In this case, further, when it is desired to narrow down the above users, each computer is also required to send the contents necessary for judgement of the narrowing-down condition together with the searching data. More specifically, when the aforementioned first condition is used, the user identifier of the search objective user is required. To this end, each computer is arranged to sequentially hand over the user identifier of the search objective user to another computer from the searching originator computer. In the case of the employment of the foregoing fifth condition, the number of computers through which the searching data reached my computer is necessary. To this end, each computer is arranged so that, at the time of sending the searching data, a count value received by my computer is incremented and then sent.

Although the use times of the users have been set in the searching data and collective response data in the foregoing first and second embodiments, this is not necessarily required for the searching of connecting paths and therefore it may be omitted.

Though the user who conducted an illegal action has been treated as the search objective user in the foregoing first and second embodiments, the definition of the 'illegal action' can be arbitrarily made and even such a user as not to conduct an illegal action may be treated as the search objective user so long as the user satisfies a predetermined condition.

Explanation will then be made as to a third embodiment of the present invention.

The third embodiment corresponds to a case where the basic principle of the above network connection-path searching method is applied so that a managing computer for management of a network is uniquely implemented.

A network system in accordance with the third embodiment has substantially the same arrangement as FIG. 8, except that, in the third embodiment, the managing computer is required to acquire all access logs recorded in respective computers.

FIG. 12 shows an exemplary structure of the managing computer and one of other computers in accordance with the third embodiment.

As shown in FIG. 12, in a computer 1202, an access log informer 1203 periodically (or in response to a request from a managing computer 1201) informs the managing computer 1201 of all access logs recorded in the access log recording file 112.

In the managing computer 1201, an access log collector 1204 stores the informed access log from the computer 1202 into an access log storage database 1205.

When storing the access log in the access log storage database 1205, the access log collector 1204 must be made correspondence between the access log and the computer identifier of the computer 1202 as the originator of the collection of the access log.

In the third embodiment, an access log analyzer 1206 in only the managing computer 1201 refers to the access logs stored in the access log storage database 1205 to uniquely execute its searching procedure. To this end, in the third embodiment, the computer 1202 has substantially the same structure as in the foregoing first embodiment, except that the computer 1202, which does not contribute to the searching operation, is not required to have such an operating system 110 as to contain a searching program.

A network administrator examines the access logs stored in the access log storage database 1205 of the managing computer 1201 and, when finding a user as the search objective user and a computer as the searching originator computer, the network administrator enters in the managing computer 1201 a search command indicative of a search instruction, with the computer identifier of the computer in question, the user identifier of the user in question and the use time thereof as parameters.

Figure 13:
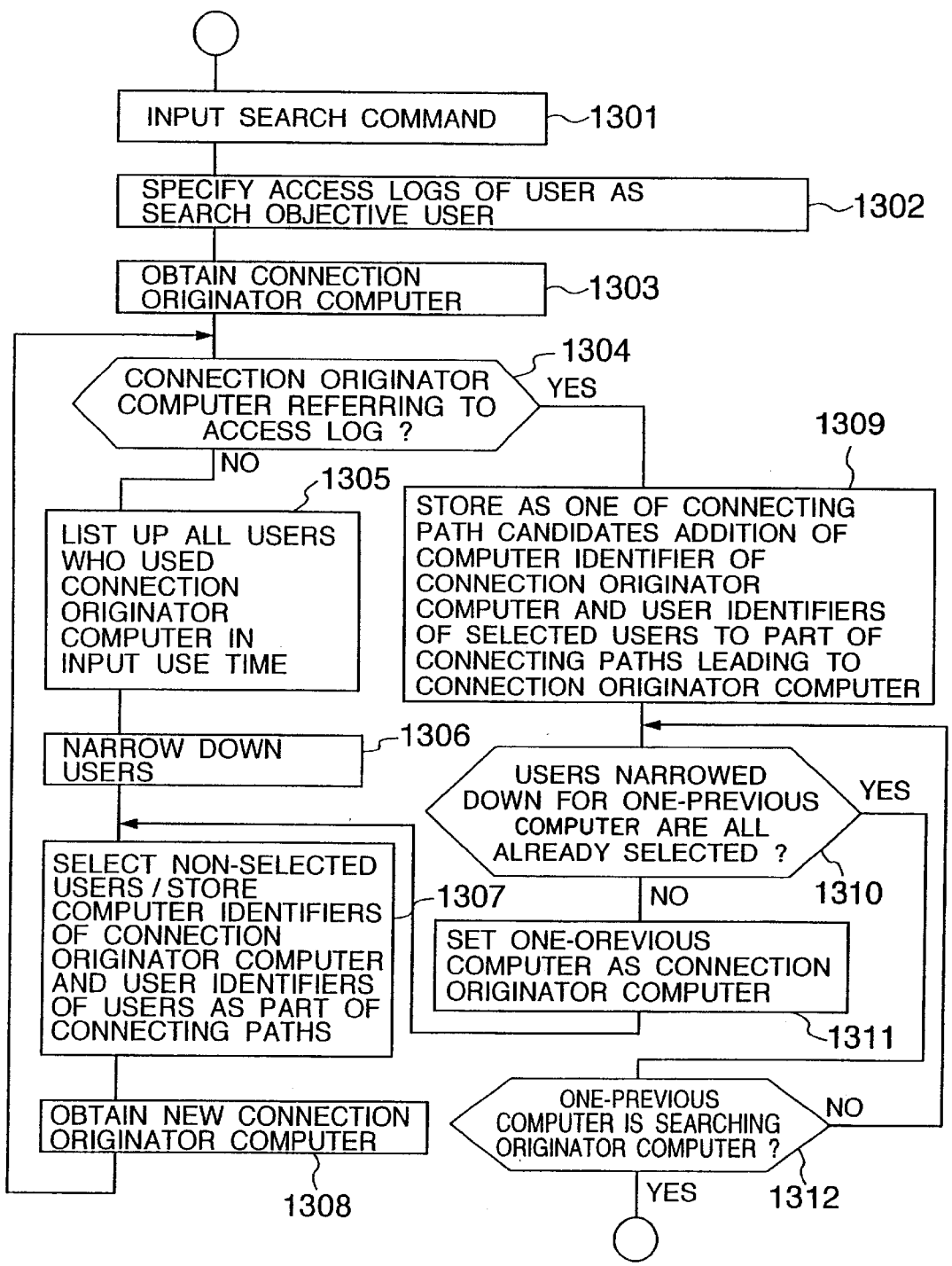
FIG. 13 is a flowchart showing a processing procedure of the managing computer in the third embodiment.

When receiving the search command, the managing computer 1201 executes such a processing procedure as shown by a flowchart in FIG. 13.

More in detail, When the managing computer 1201 receives the search command (step 1301), the access log analyzer 1206 in the computer executes such searching operations as shown in steps 1302 to 1312.

In the searching operations, the managing computer 1201 first selects one of access logs collected from the computer (searching originator computer) indicated by the computer identifier in the parameters of the search command entered in the step 1301, which coincides therewith in the user identifier and use time in the parameters (step 1302). And the managing computer 1201 refers to the access log selected in the step 1302, finds the computer identifier recorded in the access log, and determines the computer corresponding to the found computer identifier as a 'connection originator computer' (step 1303).

When the computer identifier of the connection originator computer corresponds to the computer identifier of the computer referred to in the current access log, this means that this computer is one of candidates of the logical connection originator computer which the user (search objective user) corresponding to the user identifier in the parameters of the search command entered in the step 1301, actually used (step 1304). Thus the managing computer 1201 then proceeds to the step 1309 to set one of connecting paths leading to the computer in question as a candidates.

When the computer identifier of the connection originator computer does not correspond to the computer identifier of the computer referred to in the current access log, this means that this computer is not one of candidates of the logical connection originator computer which the search objective user actually used (step 1304). Thus the managing computer 1201 then proceeds to the step 1305 to search for candidates of the logical connection originator computer which the search objective user actually used.

In the step 1305, the managing computer 1201 refers to the access logs collected from the connection originator computer, and lists up all the users who used the connection originator computer in the use time (use time of the search objective user) in the parameters of the search command entered in the step 1301.

And the managing computer 1201 further narrows all the users listed up in the step 1305 down to ones who satisfy predetermined conditions (step 1306). In this conjunction, the narrowing-down condition is, for example, the aforementioned first to fourth conditions.

Subsequently, the managing computer 1201 selects non-selected ones of all the users narrowed down in the step 1306, and stores therein the computer identifier of the connection originator computer and the user identifiers of the selected users as part of connecting paths (step 1307).

In the step 1307, when the part of the connecting paths leading the connection originator computer is already stored, the managing computer adds the computer identifier of the connection originator computer and the user identifiers of the selected users to the contents already stored.

Next, the managing computer 1201 refers to the access logs collected from the connection originator computer, finds the computer identifier recorded together with the user identifiers of the users selected in the step 1307, regards the computer corresponding to the found computer identifier as a new connection originator computer (step 1308), and then returns to the step 1304.

In this manner, the operations of the steps 1304 to 1308 are repeated. And when the managing computer goes from the step 1304 to a step 1309, this means that one of the candidates of the logical connection originator computer which the search objective user actually used, has been searched.

Thus, in the step 1309, the managing computer 1201 separately stores an addition of the computer identifier of the connection originator computer and the user identifier of the user being now selected to part of the connecting paths leading to the connection originator computer and already stored therein, as one of the candidates of the connecting paths.

However, when the managing computer proceeds from the step 1303 quickly to the step 1309 through the step 1304, this means that the search objective user used the searching originator computer as the local computer. Thus the contents stored as one of the candidates of the connecting path in the step 1309 consists of only the user identifier of the search objective user.

This means that one of the connecting path candidates has been obtained.

Thereafter, the managing computer 1201 searches for another of the candidates on the basis of the connecting path candidate already obtained.

That is, the managing computer 1201 first refers to the contents of the connecting path stored as one of the candidates in the step 1309, finds the computer previous by one to the computer with which the logical connection originator computer candidate used by the search objective user established, and when failing to already select all the users narrowed down in the step 1306 with respect to the found one-previous computer (step 1310), regards the one-previous computer as a new connection originator computer (step 1311), and returns to the step 1307.

When already selecting all the users narrowed down in the step 1306 with respect to the found one-previous computer, the managing computer finds the computer previous by additional one to the one-previous computer until the found one-previous computer coincides with the searching originator computer (step 1312), and thereafter returns to the step 1310.

When the execution of the above searching operations is completed, this means that all the connecting path candidates from the candidate of the logical connection originator computer which the search objective user actually used to the searching originator computer have been obtained. Thus, the managing computer 1201 displays these candidates on its screen.

In the third embodiment, the managing computer 1201 refers to the access logs stored in the access log storage database 1205 to uniquely execute the searching procedure. Thus in the searching procedure, it is possible to again use the once found logical connection which is common to 2 or more connecting path candidates.

As has been explained in the foregoing, in accordance with the third embodiment, with use of only generally-recorded access logs and without using any special information, the managing computer 1201 can obtain the candidates of the computer (the logical connection originator computer logically connected to the searching originator computer) which the search objective user actually used as well as the connecting path candidates to the searching originator computer.

In particular, when the users listed up are narrowed down, the number of candidates obtained by the managing computer 1201 can be reduced. Thus, even in the case of a large scale network system, effective searching can be realized.

In the case where the foregoing third embodiment is configured so that, only when part of the connecting paths already stored satisfies a predetermined condition, the operations of the step 1305 of FIG. 13 and subsequent steps are executed; the number of candidates obtained by the managing computer 1201 can be decreased.

Usable as the narrowing-down condition is the aforementioned fifth condition. In order to judge whether or not to satisfy the fifth condition, it is only required to examine the number of computer identifiers contained in part of the already stored connecting paths.

Further, in the case where the foregoing third embodiment is arranged so that, only when the predetermined condition is satisfied, one of the connecting path candidates is stored; the number of candidates obtained by the managing computer 1201 can be reduced.

Usable in this connection as the narrowing-down condition (referred to as the seventh condition, in the following description) is, for example, 'the number of computers present in the connecting paths obtained as the candidates be equal to or larger than a predetermined value'. In order to judge whether or not to satisfy the seventh condition, it is only required to examine the number of computer identifiers contained in one of the connecting path candidates stored.

The seventh condition used as the above narrowing-down condition actually corresponds to the aforementioned sixth condition in the foregoing first and second embodiments. The use of the seventh condition provides substantially the same effects as the use of the aforementioned sixth condition.

Although the searching procedure has been automatically executed under control of the managing computer 801 when the searching originator computer informs the managing computer 801 of the detection of the search objective user in the foregoing seventh embodiment, such another modification may be allowed that the searching procedure is executed, for example, when the network administrator enters a certain command.

With such an arrangement, when the network administrator examines the access logs collected by the managing computer 801 from the respective computers and finds the to-be search objective user, the network administrator can enter in the managing computer 801 a search command with the computer identifier of the collection originator computer of the access log in which the user in question was found, the user identifier of the user in question and a use time thereof as parameters.

In this case, it is required that the respective computers periodically (or in response to a request from the managing computer 801) inform the managing computer 801 of all the access logs recorded in the respective computers so that the managing computer 801 can store the access logs informed from the respective computers in the access log storage database.

What is claimed is:

1. A method for searching for a network connecting path between two of managing objective computers in a network system which includes said managing objective computers and a managing computer, said method comprising the steps of:

supervising, at said managing computer using a managing program, utilization status of said managing objective computers, transmitting a first search request to a managing objective computer used by a search objective user if said search objective user is detected, and receiving a search result after a searching operation as to said first search request is terminated;

receiving, at said managing objective computers using a search agent program, said first search request, searching a search objective user associated with said first search request, transmitting a second search request to a computer establishing a logical connection associated with said search objective user, and receiving a corresponding search result to transmit the corresponding search result to said managing computer; and searching, at said managing objective computers using said search agent program, a user of a managing objective computer at a time when said search objective user uses if said second search request is received from other search agent program, issuing a third search request to a computer establishing a logical connection associated with said user of said managing objective computer, and receiving a search result to transmit the search result to said other search agent program.

2. A method according to claim 1, comprising the step of:

transmitting, at said managing objective computers using said search agent program, said search agent program with said second search request to a computer used by said search objective user, when a search operation becomes necessary.

3. A method for searching for a network connecting path in a network system which includes a plurality of computers capable of being shared by one or more users and in which a logical connection between two of the computers is established by a pair of communication ports associated with users of the two computers to manage a computer identifier of an establishment request originator computer which required the establishment of the logical connection, user identifiers of the users associated with the logical connection in a searched computer, and use time information of the users, a method for searching for a network connecting path from a logical connection destination computer with respect to users who logically connected to another computer through one or more logical connections, comprising the steps of:

transferring a search request containing the use time information of the search objective user, from the computer which detected the search objective user to the computers which established the logical connections associated with the search objective user;

selecting users who used a searched computer in a use time of the use time information of the search objective user contained in the search request;

in the present of the computer which established the logical connection associated with the users selected, transferring to the computer a search request containing the use time information of said search objective user;

in the absence of the computer which established the logical connection associated with the users selected, using as its search result the computer identifier of a searched computer and the user identifiers of the users in the searched computer; and in the case of not transferring the search request, transferring the search result obtained to the search request originator computer which transferred the search request to a searched computer and, in the case of transferring the search request, collectively transferring the search result received from the search request destination computer and the search result obtained to the search request originator computer which transferred the search request to the searched computer, wherein the computer which received the search request from another computer reduces the number of the users selected to the users who satisfy one or more predetermined conditions that one or more predetermined operation conditions performed by the search objective user is determined.

4. A method for searching for a network connecting path according to claim 3, wherein said one or more predetermined operation conditions include a condition that information for identifying a user using the computer is referred to or rewritten, and a condition that an authority for a specific manager peculiar to the computer is taken or going to be taken.

5. A method for searching for a network connecting path between two of managing objective computers in a network system which includes said plurality of managing objective computers and a managing computer, by a managing program loaded on said managing computer, said method comprising the steps of:

supervising utilization status of said managing objective computers;

transmitting a first search request to a computer used by a search objective user if said search objective user is detected; and receiving a search result after a searching operation as to said first search request is terminated.

6. A method for searching for a network connecting path between two of managing objective computers in a network system which includes said plurality of managing objective computers and a managing computer, by said managing objective computer, the method comprising the steps of:

receiving a first search request from a managing program loaded on said managing computer, searching a search objective user associated with said first search request, transmitting a second search request to a computer establishing a logical connection associated with said search objective user, and receiving a corresponding search result to transmit the corresponding search result to said managing program, by a search agent program loaded on said managing objective computers; and searching a user of a managing objective computer using said managing objective computer loaded with said search agent program at a time when said search objective user uses if said second search request is received from other search agent program, issuing a third search request to a computer establishing a logical connection associated with said user of said managing objective computer, and receiving a search result to transmit said search result to said other search agent program by said search agent program.

7. A system comprising:

a managing computer for supervising utilization status of a plurality of managing objective computers, transmitting a first search request to a computer used by a search objective user if said search objective user is detected, and receiving a search result after a searching operation as to said first search request is terminated, by a managing program loaded on said managing computer, and said plurality of managing objective computers for receiving said first search request from said managing program, searching a search objective user associated with said first search request, transmitting a second search request to a computer establishing a logical connection associated with said search objective user, and receiving a corresponding search result to transmit the corresponding search result to said managing program, by a search agent program loaded on said managing objective computers, and for searching a user of a managing objective computer using said managing objective computer loaded with said search agent program at a time when said search objective user uses if said second search request is received from other search agent program, issuing a third search request to a computer establishing a logical connection associated with said user of said managing objective computer, and receiving a search result to transmit said search result to said other search agent program by said search agent program, wherein said system searches for a network connecting path between two of said managing objective computers in a network system which includes said plurality of managing objective computers and said managing computer.

8. A system according to claim 7, wherein said search agent program is transmitted with said second search request to a computer used by said search objective user, by said managing computer loaded with said search agent program, when a search operation becomes necessary.

9. A managing computer connected to a network including a plurality of managing objective computers, comprising:

means for supervising utilization status of said managing objective computers;

means for transmitting a first search request to a computer used by a search objective user if said search objective user is detected; and means for receiving a search result after a searching operation as to said first search request is terminated, wherein a network connecting path between two of said managing objective computers is searched by a managing program loaded on said managing computer.

10. A managing objective computer connected to a network including a managing computer and a plurality of managing objective computers, comprising:

means for receiving a first search request from a managing program loaded on said managing computer, searching a search objective user associated with said first search request, transmitting a second search request to a computer establishing a logical connection associated with said search objective user, and receiving a corresponding search result to transmit the corresponding search result to said managing program, by a search agent program loaded on said managing objective computers, and means for searching a user of a managing objective computer using said managing objective computer loaded with said search agent program at a time when said search objective user uses if said second search request is received from other search agent program, issuing a third search request to a computer establishing a logical connection associated with said user of said managing objective computer, and receiving a search result to transmit the search result to said other search agent program by said search agent program, wherein a network connecting path between two of said managing objective computers in said network system is searched.

11. A program for searching for a network connecting path between two of managing objective computers in a network system which includes said plurality of managing objective computers and a managing computer, said program comprising:

a managing program loaded on said managing computer for supervising utilization status of said managing objective computers, transmitting a first search request to a computer used by a search objective user if said search objective user is detected, and receiving a search result after a searching operation as to said first search request is terminated;

a search agent program loaded on said managing objective computers for receiving said first search request from said managing program, searching a search objective user associated with said first search request, transmitting a second search request to a computer establishing a logical connection associated with said search objective user, and receiving a corresponding search result to transmit the corresponding search result to said managing program, and for searching a user of a managing objective computer using said managing objective computer loaded with said search agent program at a time when said search objective user uses if said second search request is received from other search agent program, issuing a third search request to a computer establishing a logical connection associated with said user of said managing objective computer, and receiving a search result to transmit the search result to said other search agent program.

12. A program according to claim 11, comprising the step of:

transmitting said search agent program with said second search request to a computer used by said search objective user, by said managing computer loaded with said search agent program, when a search operation becomes necessary.

* * * * *